Jan. 3, 1956  R. G. FRIEDMAN  2,729,319
FLUID OPERATED MULTIPLE DISC CLUTCH
Filed Oct. 3, 1951  2 Sheets-Sheet 1
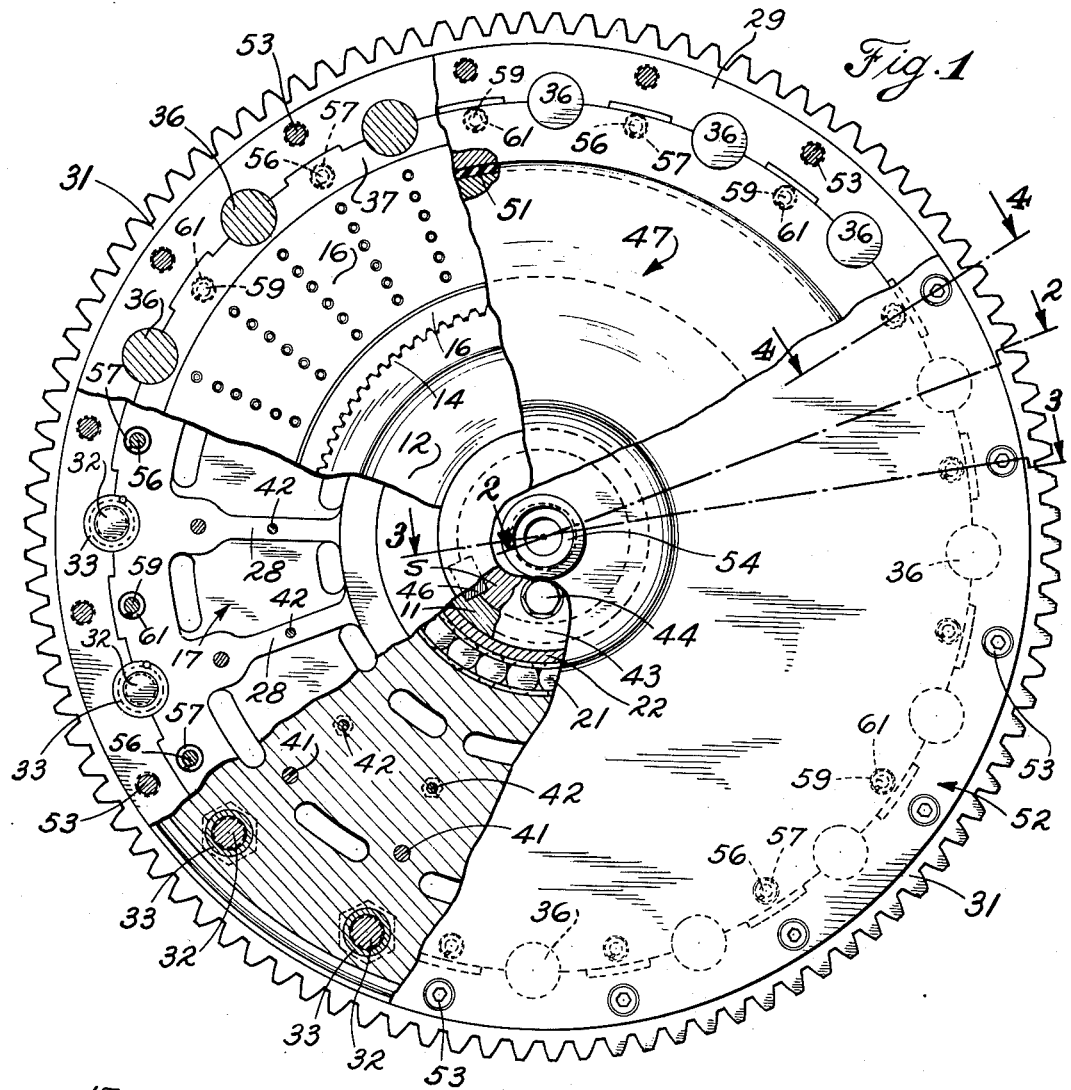
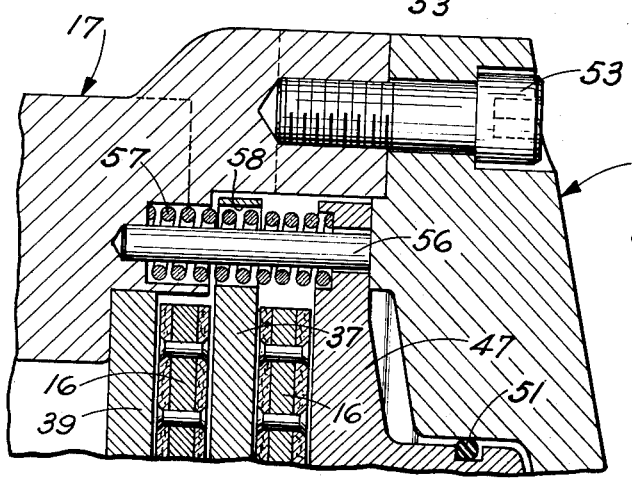
INVENTOR.
ROBERT G. FRIEDMAN
BY
Richey & Watts
ATTORNEYS

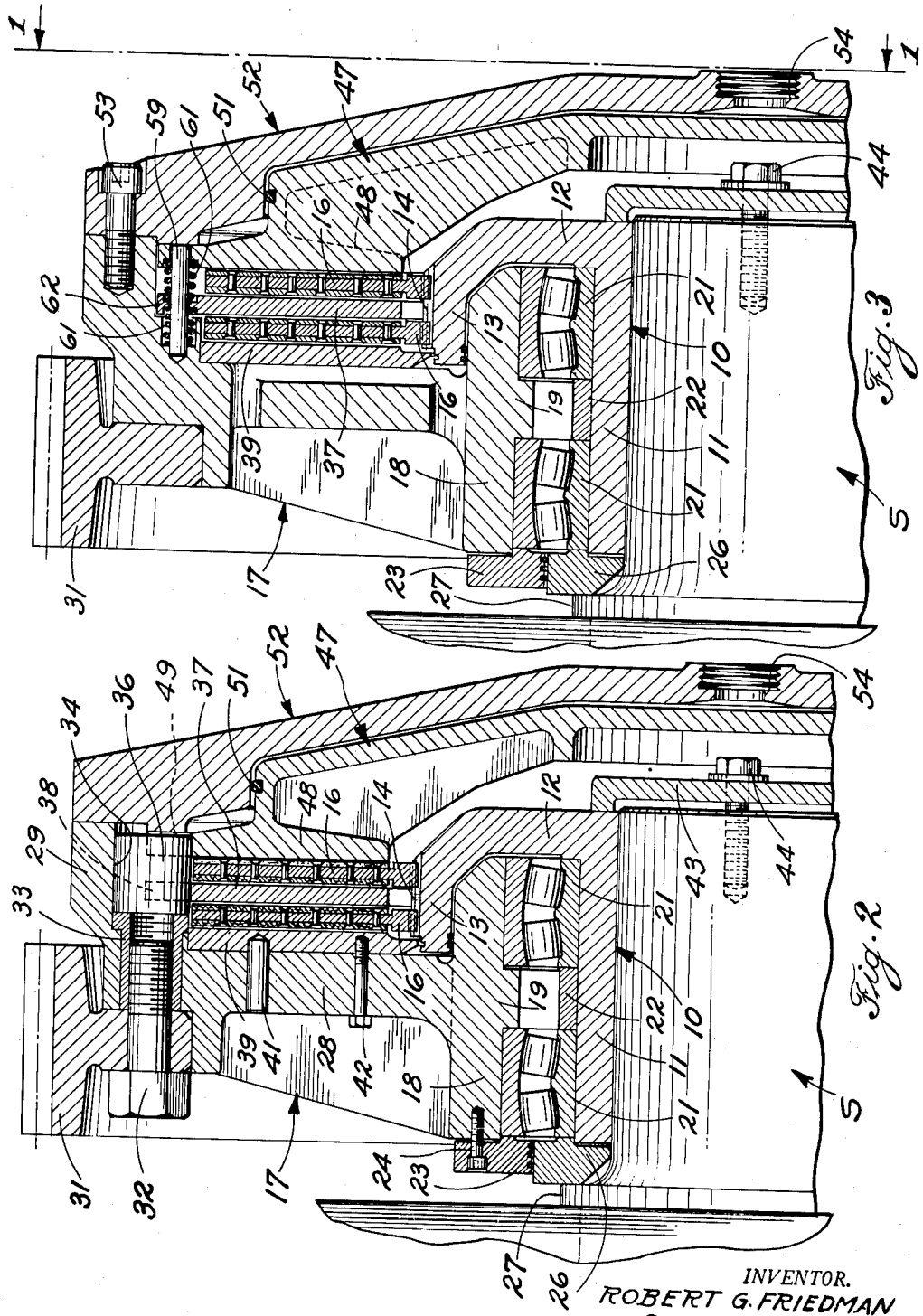

United States Patent Office 2,729,319
Patented Jan. 3, 1956

2,729,319

FLUID OPERATED MULTIPLE DISC CLUTCH

Robert G. Friedman, Tiffin, Ohio, assignor to National Machinery Co., Tiffin, Ohio, a corporation of Ohio Application October 3, 1951, Serial No. 249,515

2 Claims. (Cl. 192—85)

This invention relates to clutches and more particularly to clutches such as those fitted to heavy duty machinery including metal-working presses, rolling and forging machines, and the like. For example, it is sometimes desired to have a machine that operates in cycles with pauses between the cycles for insertion and removal of the work. Thus, in the metal-working arts it is customary to build a certain type of metal working press or similar machines wherein a large high-inertia fly wheel is power driven and clutched and de-clutched to a crank shaft operating the metal working roll, ram or slide, or the clutch may be incorporated in the fly wheel. Thus, the energy is imparted over a period of time to the fly wheel by a relatively small motor or the like and is in turn imparted over a shorter period of time to the tools for the performance of heavy work upon metals. In any event and regardless of whether or not a separate fly wheel is employed, there is a need for heavy duty clutches that must transmit large forces and be repeatedly connected and disconnected during operation of the machine.

The principal object of the invention is the improvement in the effective life and operating characteristics of clutches of the nature referred to as well as in rendering maintenance and servicing of such devices more rapid and effective, thereby reducing the down time of the machine upon which the clutch is intended to operate. These objects are accomplished by the improvements in the construction of the clutch that makes it a simple matter to remove the clutch from the machine for servicing to the bearings and other wearing surfaces, as well as improvements in the parts that key relatively slidable friction members together for simultaneous rotation and the transmission of energy to other friction elements upon actuation of the clutch. The manner in which the heavy duty clutch may be built to attain the aforesaid advantages and objects will be apparent in the following detailed description of the preferred embodiment of the invention.

In the drawings:

Fig. 1 is a side elevation of the clutch with parts broken away for clarity;

Figs. 2 to 4 are partial sections taken respectively as indicated on Fig. 1.

In the application of the invention illustrated, the clutch is mounted on a stub projection of a heavy shaft S which forms a part of the apparatus to be driven intermittently. A hub member 10 is provided formed with a mounting sleeve portion 11 that fits the projecting end of shaft S. One end of the sleeve 11 terminates in a radial flange 12 from which extends an annular flange 13 surrounding the sleeve 11. Sleeve 13 is splined as at 14 for a sliding, driving connection with a pair of friction members 16 each of which is provided with suitable facings of friction material in a manner known in the clutch and brake arts. Driving member 17 has a sleeve portion 18 surrounding the hub sleeve portion 11 and mounted on the latter by means of anti-friction bearings. The mounting includes a spacing shoulder 19 formed on sleeve 18 and a pair of combined radial and thrust bearings 21 with a spacer 22 mounted between the inner races of the bearing. A ring 23 holds the outer race of one of the bearings 21 against the flange 19 thereby locating member 17 relative to the inner races of the bearings. A clamp plate 26 is, when the clutch mounting is complete, held against a shoulder 27 on the shaft S.

A central web 28 suitably apertured for air circulation extends from substantially the mid portion of the outer sleeve 18. Driving member 17 has formed thereon an annular peripheral flange 29 which serves among other things as a mounting for a driving gear 31 retained in place by bolts 32 threaded into shouldered thimbles 33 carried by member 17. The peripheral flange has at each shoulder thimble a series of semi-circular inwardly facing notches 34 which receive a corresponding series of cylindrical metal keys 36. These keys serve to provide a sliding driving connection between the driving member 17 and a double-faced friction disc member 37 which latter member is notched as at 38 to receive the coupling keys 36. A friction wear plate 39 is mounted on the face of a web 28 and is keyed to the web by pins 41, there being a series of bolts 42 for holding the plate 39 in position on the driving member.

The hub member 10 and the driving member 17 form, in effect, a single unit due to the bearing arrangement shown. This unit is clamped in place on the stub shaft S by means of a clamp 43 and suitable bolts 44 threaded into the end of the shaft. With this mounting the hub member 10 is urged through the bearings 21 and the spacer 22 against the clamp ring 26 which is in turn urged against the shaft shoulder 27. I prefer that a suitable key 46 be included to prevent relative rotation of the hub member 10 and shaft S.

The clutch is engaged by a piston member 47 having a combined pressure and friction plate 48 for clamping the various friction elements tightly together. The piston is likewise notched as at 49 for sliding over the cylindrical key members 36, so that the piston turns with driving member 17. An O-ring seal 51 is mounted on the piston member and cooperates with an adjacent cylindrical surface formed on the cover plate 52. The latter is bolted to the peripheral flange of the driving member 17 by a series of bolts 53 and has a port 54 for the entry of operating fluid under pressure.

Two sets of springs are provided for disengagement of the clutch. As seen in Fig. 4, the piston is returned by a spring assembly including pins 56 surrounded by long springs 57 passing through apertures 58 formed in the intermediate friction disc 37. In order to center the latter upon disengagement of the clutch, the spring apparatus (shown in Fig. 3) is provided. Another set of pins 59 is surrounded by opposed short springs 61 that engage a shoulder 62 formed on the friction disc 37, tending to center the latter upon release of fluid pressure from the operating volume defined by the cover 52, piston 47, and O-ring 51.

The cylindrical keys 36 provide for increased strength and long life as well as simplifying the machining operations required to build the clutch. The key construction is sturdier than an internal spline arrangement where normal manufacturing tolerances are maintained. It is extremely expensive and difficult to machine large intermediate splines for heavy duty machinery operated by clutches of this type so that all splines take their proportionate share of the load. Where the loads are heavy, concentration of the forces at one or more splines will result in deformation of the latter and consequent lost motion and damaging shock loads.

The keys of the invention are likewise superior to square or rectangular keys which tend to cant and turn in their square sockets, becoming hour-glass in section and introducing lost motion and consequent heavy shock loads. Due to the heavy duty construction, the service and maintenance of the clutch is minimized but if it does become necessary, the entire assembly can be removed from the machine by removing bolts 53, sliding off the cover and the piston, removing clamp bolts 44 and the clamp plate 43. The apparatus including the bearings can now be removed as a unit from the machine shaft and serviced at the bench under the most favorable conditions for quick and effective service and replacement of parts. Thus, machine down-time is reduced by the improved construction of the clutch and if service is necessary it can be readily effected.

Having completed a detailed description of a preferred embodiment of the present invention so that others skilled in the art may be able to understand and practice the same, I state that what I desire to secure by Letters Patent is not limited by said preferred embodiment but rather is defined in what is claimed.

What is claimed is:

1. A clutch comprising a hub member having a mounting sleeve terminating at one end in a generally radial flange from which extends an annular flange overlying said shaft mounting sleeve, a driving member having a sleeve surrounding said mounting sleeve, anti-friction bearings between said sleeves, means for retaining said bearings and members together, a central web extending from said outer sleeve, an annular peripheral flange on said web, a series of circumferentially spaced radially inwardly facing semi-circular notches in said web flange, cylindrical keys freely positioned in said notches, abutment means adjacent the ends of said notches confining the entire axial extent of said keys in said notches, an outer friction disc, semi-cylindrical notches in said disc receiving said keys, an inner friction disc keyed to said annular flange, the engagement of said outer friction disc and said cylindrical keys being radially aligned with the engaging surface of said outer disc, a cover secured to said driving member outwardly of said friction discs, and a piston within said cover for pressing said friction discs together.

2. A clutch comprising a hub member, a driving member formed with an annular peripheral flange coaxial with said hub member and spaced therefrom, bearing means between said member, a series of circumferentially spaced radially inwardly facing semi-circular notches in said flange, cylindrical keys freely positioned in said notches, abutting means adjacent the ends of said notches confine the entire axial extent of said keys in said notches, an outer friction disc, semi-circular notches in said disc receiving said keys, an inner friction disc keyed to said hub member and power means for pressing said friction discs together, the engagement of said outer friction disc and said cylindrical keys being radially aligned with the engaging surface of said outer disc.

References Cited in the file of this patent

UNITED STATES PATENTS

| | | |
|---|---|---|
| 1,524,294 | Drake et al. | Jan. 27, 1925 |
| 1,722,522 | Hahn | July 30, 1929 |
| 2,089,733 | Criley | Aug. 10, 1937 |
| 2,091,269 | Colman | Aug. 31, 1937 |
| 2,241,241 | Clouse | May 6, 1941 |
| 2,360,489 | Gillett | Oct. 17, 1944 |
| 2,481,834 | Foster | Sept. 13, 1949 |

FOREIGN PATENTS

| | | |
|---|---|---|
| 46,913 | France | Mar. 7, 1936 |
| 20,737 | Great Britain | Sept. 18, 1907 |